H. P. MOHR.
STRAW AND CHAFF SEPARATOR AND STACKER.
APPLICATION FILED NOV. 9, 1908.
949,361.
Patented Feb. 15, 1910.
5 SHEETS—SHEET 1.
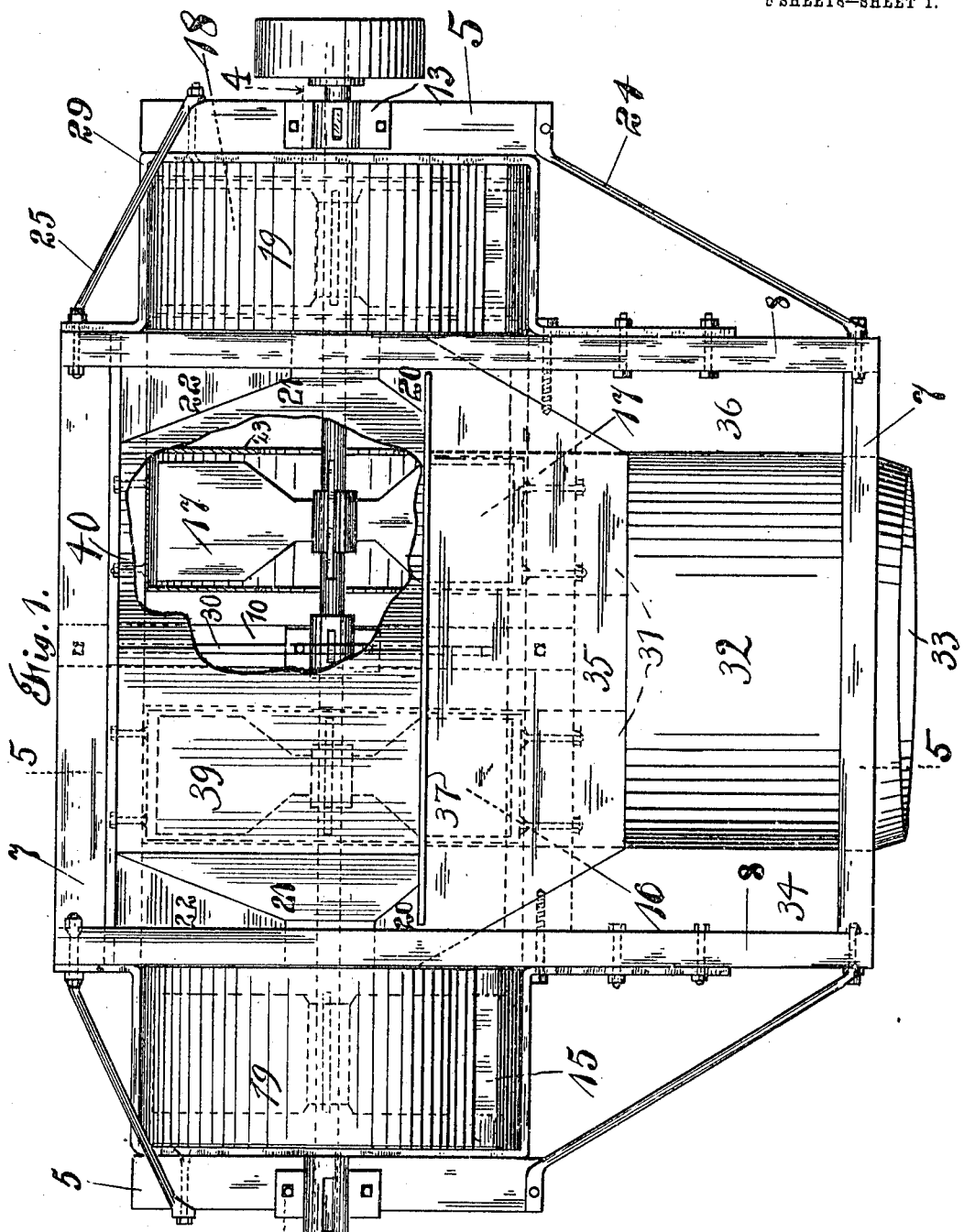

H. P. MOHR.
STRAW AND CHAFF SEPARATOR AND STACKER.
APPLICATION FILED NOV. 9, 1908.
949,361.
Patented Feb. 15, 1910.
5 SHEETS—SHEET 2.
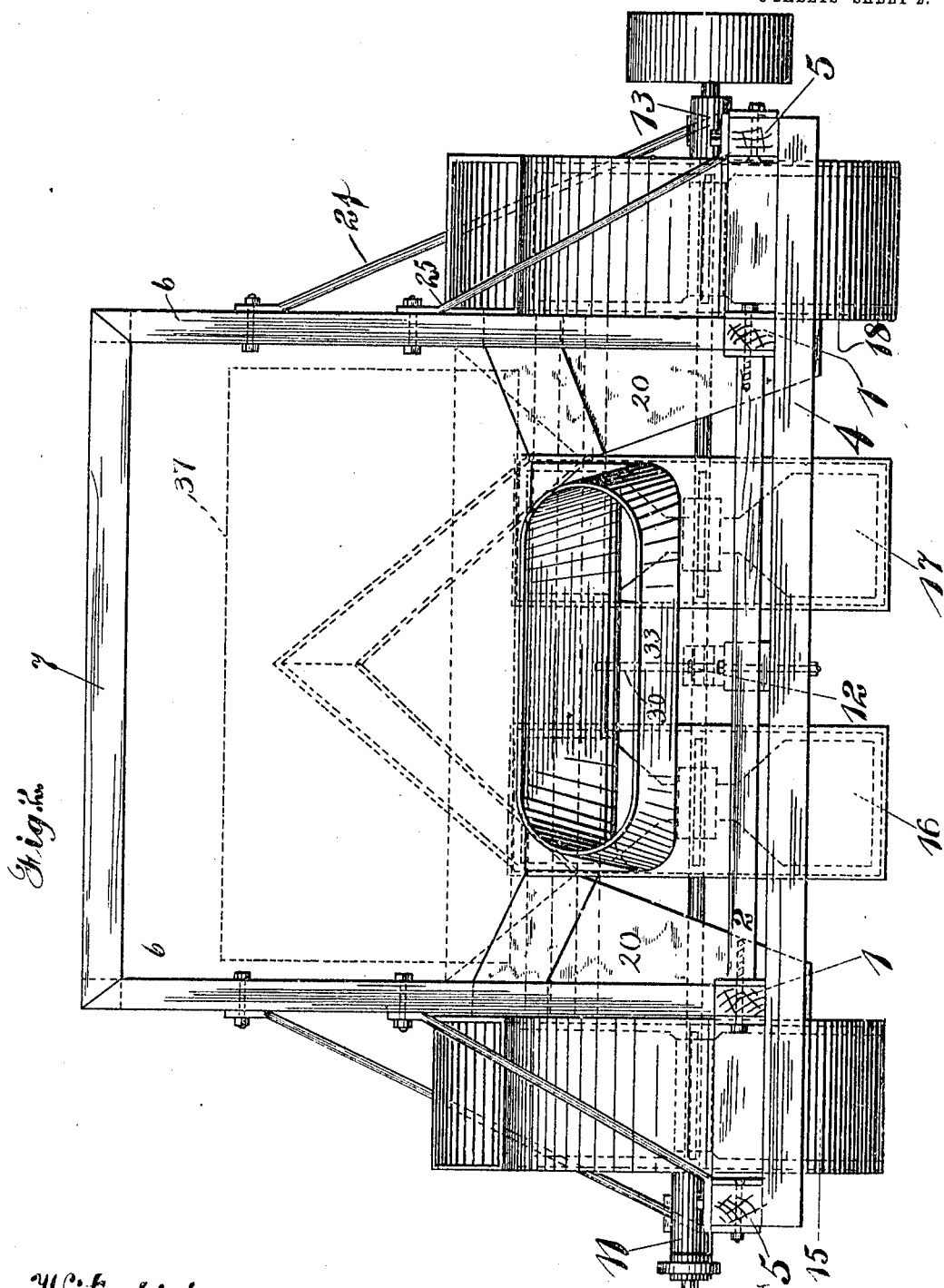
Witnesses
David J. Solari
E. J. Medina
Inventor
Henry P. Mohr
Medina and Griffin
Attorneys

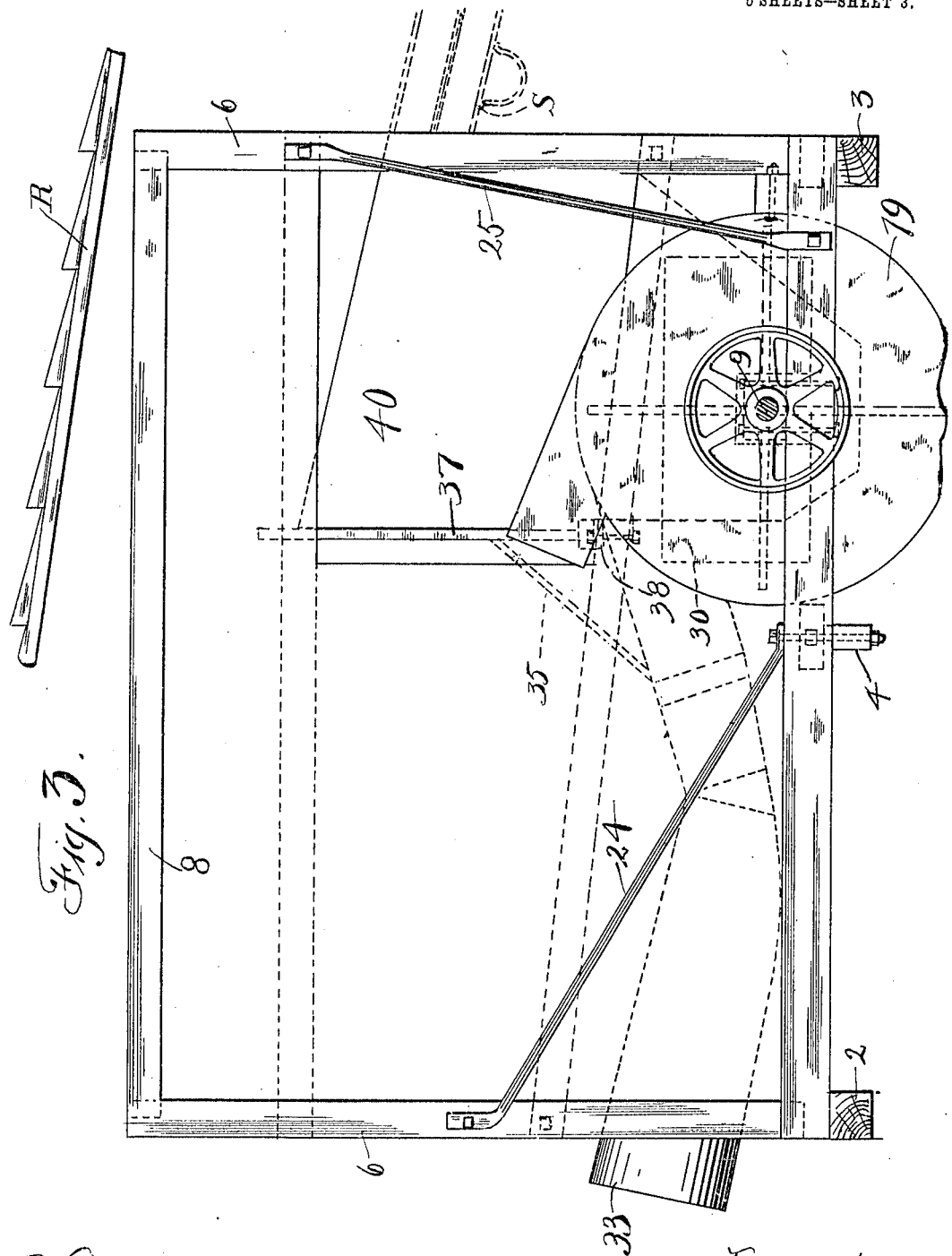

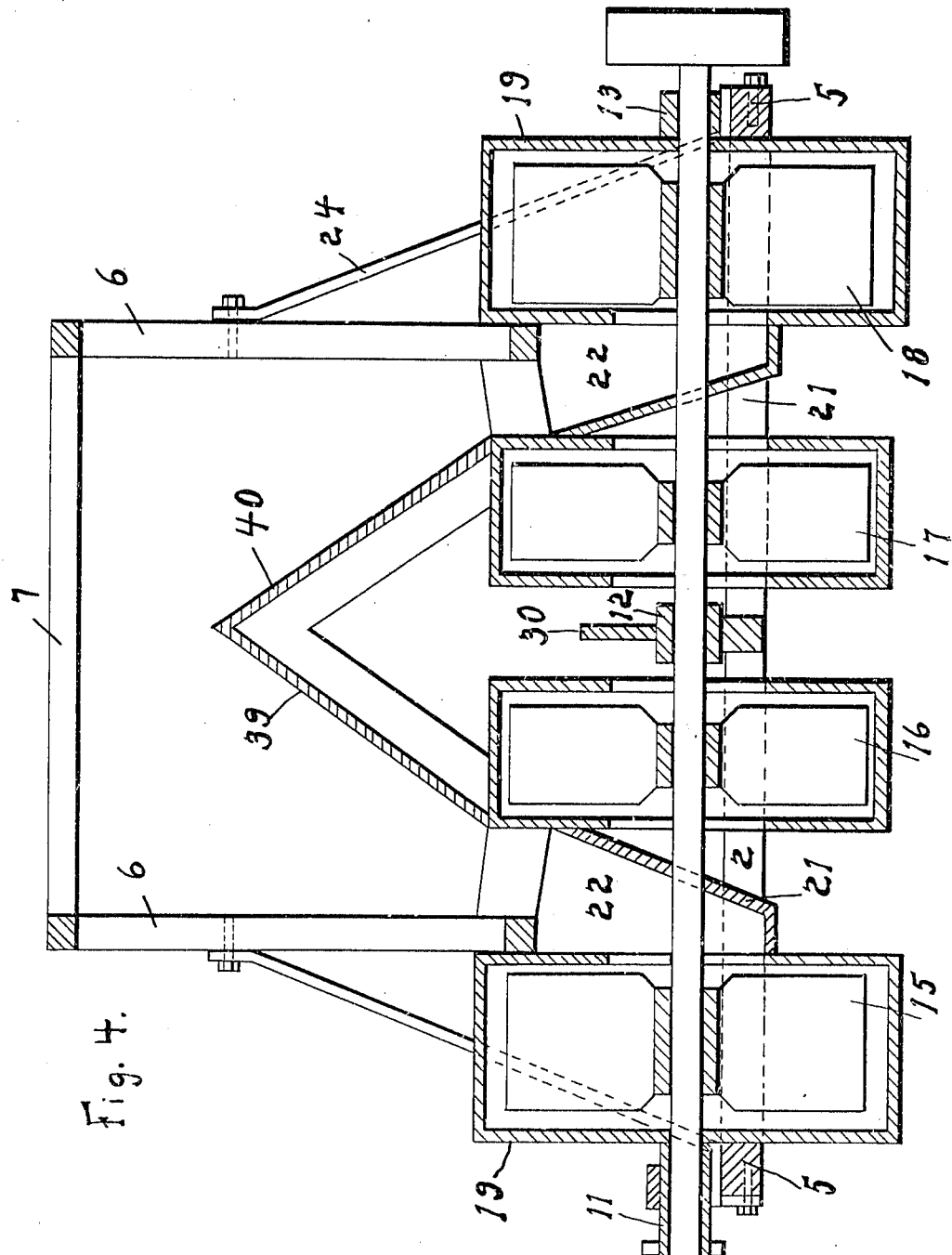

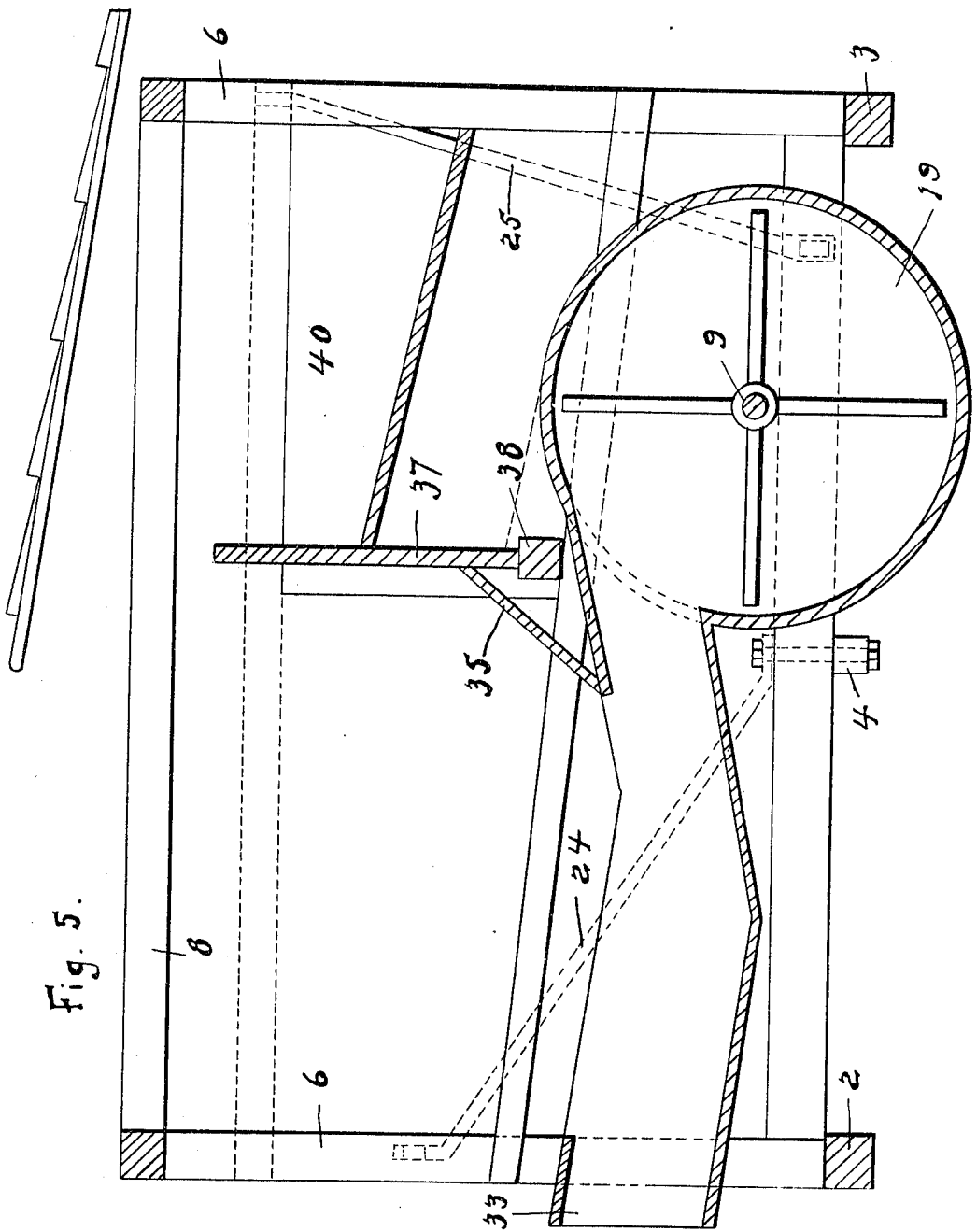

UNITED STATES PATENT OFFICE.

HENRY P. MOHR, OF PLEASANTON, CALIFORNIA.

STRAW AND CHAFF SEPARATOR AND STACKER.

949,361.  Specification of Letters Patent.  Patented Feb. 15, 1910.

Application filed November 9, 1908. Serial No. 461,679.

*To all whom it may concern:*

Be it known that I, HENRY P. MOHR, a citizen of the United States, residing at Pleasanton, in the county of Alameda and State of California, have invented a new and useful Straw and Chaff Separator and Stacker, of which the following is a specification in such full and clear terms as will enable those skilled in the art to construct and use the same.

This invention relates to a combined straw and chaff separator and stacker of the pneumatic type.

The invention is intended for handling the straw and chaff from a threshing machine, stacking each in a separate pile whereby the sale of the straw is improved for the reason that persons buying straw do not want a mass of fine chaff with it.

An object of the invention is to take a portion of the air from the machine with one set of fans in order to take away the dust and the chaff, while the second set of fans which handles the heavy straw takes all the air used by them from the atmosphere outside the threshing machine, the reason for this lying in the fact that the straw fans must handle a very large amount of air, and if this air is taken from the end of the threshing machine where the same is open it would interfere with the action of the separating screens at the back of the thresher.

Another object of the invention is to produce a stacking and separating attachment which may be attached to almost any threshing machine by simply setting it on the sills of the machine and bolting it in place.

Another object of the machine is to make use of a plurality of fans, whereby the air is more uniformly blown and whereby smaller amounts of the chaff are handled by each fan, two fans being provided for the chaff and two for the straw.

Another object of the invention is to so arrange the four fans as to require but a single belt and shaft to drive all of them.

Another object of the invention is to provide means for preventing the air from passing to one fan and not to the other, as is the case where two fans are close together, with a resultant efficiency of service.

In the drawings, in which the same character of reference is applied to the same portion throughout, Figure 1 is a plan view of the machine with certain parts broken away to show the fans underneath, Fig. 2 is a rear view of the machine, Fig. 3 is a side elevation showing the relation of the straw rack and separating shoe in dotted lines, and Figs. 4 and 5 are vertical sectional views on the lines 4—4 and 5—5 of Fig. 1, respectively.

The separator is built on the sills 1 which are secured to the end sills of any threshing machine. The sills 1 are secured together by means of the cross ties 2, 3 and 4, the former at the rear of the separator, 3 at the front end next the threshing machine and the latter near the rear of the fan cases, and extending far enough beyond each side sill to support the outer sills 5 of the chaff fans. Secured on the top of the sills 1 are four posts 6, to which in turn are secured the top plates 7, 7 and 8, 8, the two latter being parallel to the longitudinal sills of the threshing machine. The frame thus produced is suitably covered on the sides and end away from the threshing machine.

Extending across the sills 5 and 1, is a long shaft 9 which is supported at the center by means of a sill 10 which runs parallel to the side sills 1. This shaft 9 is journaled in boxes 11, 12 and 13, and has a pulley 14 on the end next the box 13, said pulley being operated from any suitable portion of the driving mechanism of the threshing machine. This shaft 9 supports four fans 15, 16, 17, and 18, the former and the latter being secured to the shaft near the ends thereof, and carrying the chaff away from the machine. The fans 16 and 17 are secured to the shaft near the middle thereof and handle the straw entirely. The fans 15 and 18 have cases 19 with eyes on one side only, that is next to the outer casing of the frame of the separator, and to which eyes a sheet metal hopper having the sides 20, 21 and 22, leads there being one hopper for each fan 15 and 18. This hopper is supported by means of the post 6, the fan case 23, and the outer sill 1. The outer supporting sills for the fan shaft 9 are held firmly in place by means of the braces 24, 25 and 29, the latter of which runs from the front end of the separator around to the rear of the same, bolts being used to secure the same to the sills 1, and to the sills 5. The braces 24 and 25 are secured at one end to the upright posts 6 and at the other end to the sills 5, for the fans at each end of the shaft 9 are equipped the same way.

The two straw fans take their supply of air from below, the hoppers leading to the chaff fans at the ends of the shaft 9, the side 21 of the chaff hopper being secured along its upper edge to the case of the straw fan, thus leaving an opening for the ingress of the air to the fan case. The cases of both straw fans are provided with eyes on both sides thereof, and since the straw fans are very close together, a board 30 is provided, to prevent the air from surging first to one of the fans and then to the other, whereby the air supply of both fans is maintained constant. The two straw fans discharge through nozzles 31 at the front end of the pan 32, said pan merging into a tapering pipe at 33 where the stacker pipe is connected to it. This pan 32 is at the bottom of the hopper formed by the sides 34, 35 and 36, into which the straw drops from the straw carrier, shown in dotted lines above the stacker. At the top of the incline 35 there is placed a vertical board 37 which is for the purpose of preventing the straw from falling into the chaff hoppers, and also for the purpose of preventing the chaff from being blown over from the shoe S, shown in dotted lines, into the straw pan. This board 37 rests on a cross piece 38 which is secured at its ends to the frame of the separator, and it touches the inclines 39, 40 which form a roof over the top of the straw fans to prevent the chaff from piling up on them, said inclines making with the sides of the frame an extension of the chaff hoppers leading to the chaff fans. This roof inclines upwardly from the separating shoe S of the thresher, the top being on about at the same level at said shoe while it is some higher at the board 37.

It will be noted that while short chutes are shown on the straw pan and on the chaff fans that it is the intention to use such length chutes as may be deemed necessary in the work to be done.

The operation of the device is simple, the fan shaft being connected with any suitable pulley of the threshing machine, the straw passes from the straw carrier R and drops into the chute at the rear of the frame where the blasts from the two straw fans blow it up the straw pipe, the chaff from the grain shoe is dropped into the hoppers at the front of the frame, that is the end of the frame next the thresher, and the chaff fans deliver the chaff to suitable chaff pipes which lead the same to any desired distance.

It is to be noted that an essential feature of the invention lies in the use of large fans to handle the straw, while the air to supply them is drawn from a source where it will not disturb the currents of air near the separating shoe.

Having thus described my invention what I claim as new and desire to secure by Letters Patent of the United States is as follows:

1. In a straw and chaff separator and stacker, a frame, a shaft carried by the frame, hoppers supported by the frame, a plurality of fans carried by the shaft, means to restrict the air drawn into the outer fans to the space above the hoppers, partitions to restrict the air drawn into the inner set of fans to the space below the sides of the hoppers, and a transverse partition to direct the chaff into the said hoppers, as set forth.

2. In a straw and chaff separator and stacker, a frame, a transverse shaft carried thereby, a plurality of fans secured to the shaft, hoppers leading to the two outside fans for elevating the chaff, a single hopper leading to the nozzles from the inner set of fans, and a discharge pipe for the straw into which the inner set of fans discharge.

3. In a straw and chaff separator and stacker, a frame, a shaft carried transversely of said frame, a plurality of fans carried by said shaft, hoppers leading to the outer set of fans, a straw pan, a hopper leading to said pan, discharge pipes leading from the inner set of fans to the straw pan, and a discharge pipe for the straw.

4. In a straw and chaff separator and stacker, a frame adapted to be secured to the sills of a threshing machine, a transverse shaft carried by the frame, a plurality of fans carried by the shaft, hoppers leading to the outer set of fans and adapted to direct the chaff thereto, a straw pan, pipes leading from the inner fans to the straw pan, a discharge pipe for the straw, and a partition board adapted to prevent the chaff from blowing into the straw hopper.

5. In a straw and chaff separator and stacker, a frame adapted to be secured to the sills of a threshing machine, a shaft carried by the frame, a series of fans carried thereby, hoppers leading to the outer set of fans and adapted to direct the chaff thereto, a straw pan, discharge pipes leading from the inner fans to the straw pan, a discharge pipe leading from the straw pan, a transverse board adapted to prevent the chaff from passing into the straw pan, and a partition board between the two inner fans for preventing one fan from interfering with the action of the second fan.

6. In a straw and chaff separator and stacker, a frame, a shaft carried by said frame and extending transversely thereof, a plurality of fans carried by said shaft, hoppers leading to the outer fans and adapted to lead the chaff to said fans, a hopper leading to the rear of the center set of fans, a straw pan into which said hopper discharges, air pipes leading into the straw pan from the inner set of fans, a board adapted to prevent the chaff from passing into the straw pan, and inclines leading to the hoppers of the outer fans whereby substantially one half the chaff is fed to each of said fans.

7. In a straw and chaff separator and stacker, a frame, a transverse shaft carried thereby, four fans on said shaft, a hopper leading to each outer fan, means to direct substantially one half the chaff to each of said hoppers, a straw pan, a hopper to direct the straw to said straw pan, pipes leading from the two inner fans to the straw pan, and a discharge pipe leading from the straw pan and into which the air from the two inner fans is directed.

In testimony whereof I have set my hand this 2nd day of November, A. D. 1908, in the presence of the two subscribed witnesses.

HENRY P. MOHR.

Witnesses:
 AUGUST PIERAGS,
 WALTER J. SCHMEEN.